United States Patent [19]  
Mori et al.

[11] Patent Number: 4,878,866  
[45] Date of Patent: Nov. 7, 1989

[54] THERMIONIC CATHODE STRUCTURE
[75] Inventors: Yoshiharu Mori, Tsuchiura; Suzuya Yamada, Machida; Mitsuaki Saito, Machida; Hirotoshi Hagiwara, Machida; Kenichi Ehara, Shibukawa, all of Japan
[73] Assignee: Denki Kagaku Kogyo Kabushiki Kaisha, Tokyo, Japan
[21] Appl. No.: 222,300
[22] Filed: Jul. 22, 1988

Related U.S. Application Data
[63] Continuation of Ser. No. 55,379, May 29, 1987.

[30] Foreign Application Priority Data
Jul. 14, 1986 [JP] Japan ................. 61-163859  
Jan. 19, 1987 [JP] Japan ................. 62-4924  
Feb. 12, 1987 [JP] Japan ................. 62-17800  
Mar. 3, 1987 [JP] Japan ................. 62-46718

[51] Int. Cl.$^4$ .................................. H01J 9/04
[52] U.S. Cl. .................................. 445/36; 219/69.12; 219/69.17
[58] Field of Search .................... 445/36, 49, 50, 29; 174/212; 219/69 W, 69 M

[56] References Cited
U.S. PATENT DOCUMENTS

| | | | |
|---|---|---|---|
| 1,735,080 | 11/1929 | Hertz | 313/310 |
| 1,815,229 | 7/1931 | Berthold et al. | 313/310 |
| 1,934,369 | 11/1933 | Mendenhall | 313/310 |
| 1,934,378 | 11/1933 | Ronci et al. | 313/310 |
| 2,071,849 | 2/1937 | Lowry | 313/310 |
| 2,263,169 | 11/1941 | Evans | 313/310 |
| 2,421,039 | 5/1947 | Segerstorm, Jr. | 313/310 |
| 2,494,895 | 1/1950 | Mulder | 174/212 X |
| 2,916,651 | 12/1959 | Upshaw | 313/342 X |
| 3,025,428 | 3/1962 | Krefft | 313/310 |
| 3,255,375 | 6/1966 | Ward | 313/344 X |
| 3,259,784 | 7/1966 | Vogel | 313/344 X |
| 3,287,591 | 11/1966 | Sloan | 313/332 |
| 3,307,924 | 3/1967 | Davis | 313/346 R X |
| 3,514,661 | 5/1970 | Reaves | 313/346 X |
| 3,737,714 | 6/1973 | Theodosopolous et al. | 313/344 |
| 3,745,403 | 7/1973 | Misumi | 313/310 |
| 3,752,950 | 8/1973 | Castanguay | 219/69 W |
| 3,772,560 | 11/1973 | Orthuber | 313/310 |
| 3,783,330 | 1/1974 | Nakanishi et al. | 313/310 |
| 4,002,884 | 1/1977 | Weiss | 313/344 |
| 4,703,556 | 11/1987 | Wilsey | 29/611 |
| 4,795,940 | 1/1989 | Leung et al. | 313/356 X |

FOREIGN PATENT DOCUMENTS

| | | | |
|---|---|---|---|
| 1951602 | 5/1971 | Fed. Rep. of Germany | 313/344 |
| 239 | 1/1972 | Japan | 445/49 |
| 0042133 | 3/1983 | Japan | 313/344 |
| 1034092 | 8/1983 | U.S.S.R. | 313/344 |
| 1045302 | 9/1983 | U.S.S.R. | 313/310 |
| 402396 | 11/1933 | United Kingdom | 174/212 |
| 419727 | 11/1934 | United Kingdom | 313/485 |
| 419866 | 11/1934 | United Kingdom | 313/344 |
| 833432 | 4/1960 | United Kingdom | 313/346 |
| 1011398 | 11/1965 | United Kingdom | 313/344 |
| 1210007 | 10/1970 | United Kingdom | 313/344 |
| 1433238 | 4/1976 | United Kingdom | 313/485 |
| 1461043 | 1/1977 | United Kingdom | 313/344 |
| 1571142 | 7/1980 | United Kingdom | 313/346 |

OTHER PUBLICATIONS

"Multicusp H− Ion Source at KEB (II)" published on 1985 from Tokagi et al, Proceedings 9th Symp. on ISIAT in Tokyo, pp. 109–110.  
"Ion Source Technology" by Junzo Ishikawa published in May 1986 (Copy Attached), in Japan pp. 440–445.  
Leungi, "Directly Heated LaB$_6$ Cathodes for Ion Source Operation", Vacuum, vol. 36, Nos. 11–12, pp. 865 to 867, published on 1986 (Copy attached) by Pergamon Journals Ltd., pp. 1717–1722.  
Goebel et al, "Large-Area Lanthanum Hexaboride Electron Emitter", published in Sep. 1985, Review Sci. Instruments, 56(9).  
Ohara et al, "3D Simulation of the Prmary Electron Orbits in a Magnetic Multi-Pole Plazma Source", published on 1986 from Proceedings 10 Symp. on ISIAT in Tokyo.

Primary Examiner—Kenneth J. Ramsey  
Attorney, Agent, or Firm—Oblon, Spivak, McCelland, Maier & Neustadt

[57] ABSTRACT

A thermionic cathode structure comprises two parallel thermionic electron emitter elements which are made of a heat resistant and electric conductive inorganic compound. Each of them has one end electrically closed and the other end functioning as a current feeding port.

5 Claims, 10 Drawing Sheets

THERMIONIC CATHODE STRUCTURE

This application is a continuation of application Ser. No. 055,379, filed on May 29, 1987, now abondoned.

The present invention relates to a thermionic cathode structure as a thermionic source for apparatuses such as various ion sources, plasma generators, electron beam accelerators, gas ion lasers, tri-electrode sputtering devices and so on.

There has been becoming a common technique to utilize an ion beam in an ion implantation and a microlithography process for manufacturing ultra-LSIs. For this purpose, use of an ion source is made to have thermionic electrons from a heated cathode impinged on gas to thereby cause an electric discharge. It is important that the intensity of the ion beam is incerease to shorten time for ion implantation or ion beam etching. To increase the ion beam intensity, a thermionic cathode with a therminoic electron emitter made of a heat resistant and electric conductive inorganic compoud has been proposed instead of the conventional thermionic cathode using a metal substrate having a high melting point. Since the proposed thermionic cathode is made of a material having a small work function and has a large surface area, it can remarkably increase the ion beam intensity in comparison with the conventional therminoic cathode having a high melting point. Further, the proposed thermionic cathode has a relatively low operation temperature and accordingly, wearing of the cathode due to evaporation can be minimized, so that its lifetime can be prolonged. For instance, prolongation of the lifetime was successfully attained by replacement of tungsten with lanthnaum hexaboride ($LaB_6$) for the thermionic cathode of a cusp $H^-$ ion source (A. Takagi et al., "Multicusp $H^-$ ion source at KEK(II) Proc., 9th symp. on ISIA There has been known a small sized thermionic cathode prepared by winding a thermionic electron emitter made of a metal such as tungsten, tantalum etc. in a coiled form ("Ion Source Technology by Junzo Ishikawa, published by IONICS Kabushiki Kaisha, in May, 1986). The thermionic cathode formed by the coiled thermionic electron emitter has, however, a disadvantage that a magnetic field is apt to produce. The magnetic field makes a plasma produced by the electron beam non-uniform, and it adversely affects stabilization of the ion beam. For instance, in an electron-bambardment type ion source which is used for manufacturing LSIs and another application, a thermionic cathode is to obtain an electric discharge by having thermionic electrons impinged with gas. However, when the magnetic field is formed around the thermionic cathode, the magnetic field disturbs a stream of the thermionic electrons, whereby ununiform discharge in the gas takes place ("3D Simulation of the Primary Electron Orbits in a Magnetic Multipole Plasma Source" by Y. Ohara et al., Proc. 10th symp. on ISIAT, Tokyo, '86, p 157 (1986)).

On the other hand, there is known a thermionic cathode of such a type that a thermionic electron emitter obtained by finishing a sintered product of lanthaum hexaboride into a disc form or a flat sheet form is used, and a tungsten filament is placed nearby the thermionic electron emmitter so that it is heated by a radiant heat from the filament ("Large - area lanthanum hexaboride electron emitter" by D.M. Goebel et al., Rev. Sci. Instrum. 56(9), Sept. 1985, pages 1717-1722).

However, such an indirectly heated thermionic cathode requires a large heating power; the structure of the cathode assembly is complicated, and characteristics of emission is deteriorated because a metal constituting the filament is evaporated and deposited on the surface of the thermionic cathode.

Further, there is known a direct heated thermionic cathode wherein an electric current is supplied to both ends of a hairpin filament made of lanthanum hexaboride ("Directly heated $LaB_6$ cathodes for ion source operation" by K.N. Leung, Vacuum/volume 36/numbers 11/12, pages 865–867).

However, although this thermionic cathode can eliminate the above-mentioned disadvantages, a magnetic field is resulted around the fliament because a heating current is passed in the filament.

Generally, it is necessary to attach a thermionic cathode to support electrodes in an apparatus such as an ion source in a stable and replaceable manner. Sometimes, the thermionic electrode is attached to a terminal block made of an insulting substrate. However, the thermionic cathode assembly had the following disadvantage. Namely, when the cathode assembly is used in a plasma, a metallic material constituting the cathode assembly is subjected to sputtering effect by ions in the plasma to thereby result in vapor deposition of the metal on the surface of the thermionic electron emitter with the consequence of deterioration of thermionic electron emission properties. Further, the evaporated metal is deposited on insulating parts (e.g., a the terminal block, an isulator, a spacer and so on as the parts of the thermionic cathode assembly), whereby the insulating properties of the insulating parts are reduced so that short circuiting is easily caused.

For the problem of vapor deposition of the metal on the thermionic electron emitter, there was no way other than the thermionic cathode being replaced. For the problem of deterioration of the insulating properties, only possible way is to broaden the distance between both terminals or to form ridges and recesses on the surface of the insulating substrate placed between both terminals. However, such measures hinder miniaturization of the insulating parts.

It is an object of the present invention to provide a thermionic cathode structure which effectively cancels a magnetic field produced around a thermionic electron emitter so as not to undergo adverse effect by the magnetic field.

It is a second object of the present invention to provide a thermionic cathode structure which provides a large emission current and minimizes heat loss caused by radiation of heat.

It is a third object of the present invention to provide a thermionic cathode structure allowing a long time use in a stable manner without influence of spattering.

It is a fourth object of the present invention to provide a thermionic cathode structure being durable to thermal shock and easy to handle even when a fragile thermionic electron emitter is used.

The foregoing and the other objects of the present invention have been attained by providing a thermionic cathode structure comprising two thermionic electron emitter elements which are substantially parallel to each other in that position which is the emission portion (hereinafter referred to as being parallel) made of a heat resistant current conducting inorganic compound, wherein one end of each of the emitter elements is electrically connected to the other element and the other ends function as a current feeding port.

As another aspect of the present invention, there is provided a thermionic cathode structure comprising a single elongated thermionic electron emitter made of a heat resistant current conducting compound which is bent in a double helix form in parallel with each other in a plane, wherein both ends of said snaked thermionic electron emitter constitute current feeding ports.

DETAILED DESBRIPTION OF THE DRAWINGS

In the following, preferred embodiments of the present invention will be described with reference to the drawings.

Figure 1:
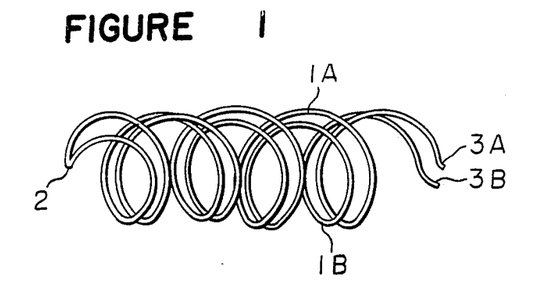
FIG. 1 is a perspective view of an embodiment of a thermionic electron emitter in a spiral form which is used for the thermionic cathode structure according to the present invention.

FIG. 1 shows an embodiment of a thermionic electron emitter used for the thermionic cathode structure according to the present invention in which two thermionic electron emitter elements 1A, 1B are extending in a generally parallel relationship along their working surface with each other and are wound in a spiral form. One end of each the elements is electrically closed (i.e. electrically to each other connected) which constitutes a turning point, and each other end 3A, 3B are used for a current feeding port. As a matter of course, the thermionic electron emitter can be formed by a single elongated material without closing them at the turning point 2.

In the present invention, a heat resistant and electric conductive inorganic compound is such that firstly, it is a hexaboride of at least one element selected from the group consisting of alkaline earth metals and lanthanum group elements having the atomic number of from 57 to 71; secondary, it is a diboride of at least one element selected from Ti, Zr and Ta, and thirdly, it is a carbide or a nitride of at least one element selected from Ti, Zr, Hf, V, Nb and Ta, for instance, a single crystal or a sintered product of $SrB_6$, $LaB_6$, $TiB_2$, $ZrB_2$, $TaB_2$, TiC, ZrC or HFC.

The thermionic electron emitter may be manufactured by wirecut-electric-discharging a tubular substrate made of the above-mentioned compound.

When the tubular substrate is made of the single crystal, the thermionic electron emitter can be formed by finishing the single crystal tubular body by using a lathe or a grinding machine, or cutting it by using an electric discharging machine or a ultrasonic machine. On the other hand, when the thermionic electron emitter is a sintered product, a tubular sintered product is manufactured by sintering the powder of the above-mentioned compound, followed by shaving or cutting it by using the above-mentioned machine.

Figure 2:
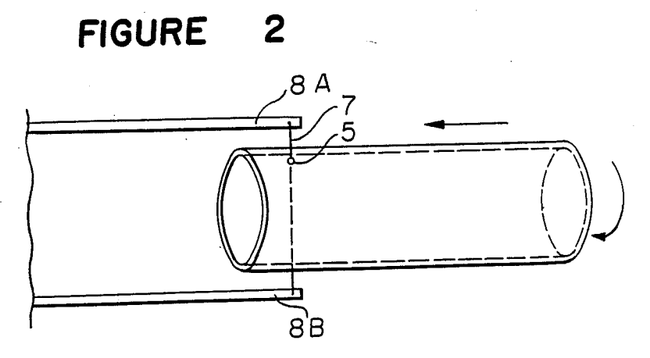
FIG. 2 is a diagram showing how the thermionic electron emitter in the spiral form shown in FIG. 1 is manufactured.

FIG. 2 shows how the thermionic electron emitter is manufactured from a tubular substrate by using a wirecut electric discharge method. Namely, a wire 7 of the wirecut electric discharge machine is applied to one end of the tubular substrate and the tublar substrate is rotated around its axial center while the tubular substrate is moved in the axial direction, thereby two juxtaposed thermionic electron emitter elements, in a spiral form can be obtained.

In the above-mentioned wirecut electric discharging method, if the wirecut discharging is started from the vicinity of one end of the tubular substrate, rather than at the extreme end of it the two juxtaposed thermionic electron emitter elements in the spiral form wherein the turning point is contained in a continuous body can be obtained.

Thus, by forming the two juxtaposed thermionic electron emitter elements in the spiral form each one end of which has the turning point, the direction of an electric current passing in the thermionic electron emitter is opposite to each other with respect to the turning point. Accordingly, the direction of a magnetic field formed around each of the elements is opposite of the other and therefore the two magnetic fields are cancelled with each other and there is no magnetic field which adversely affects the thermionic electron emitter.

Figure 3:
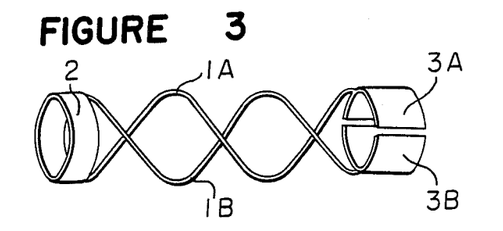
FIG. 3 is a diagram showing an example of preparation of a spirally formed thermionic electron emitter which is used for the thermionic cathode structure according to the present invention.
Figure 4:
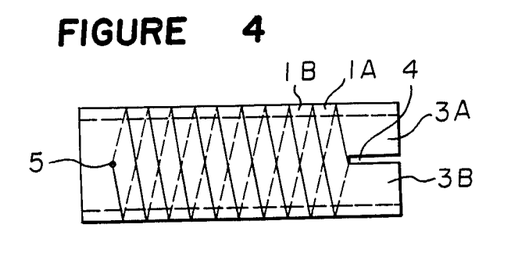
FIG. 4 is a front view of the thermionic electron emitter in the spiral form used for the thermionic cathode structure of the present invention.

FIGS. 3 and 4 show an embodiment of the thermionic electron emitter which has at its one end a pair of end parts 3A, 3B which are sparated in parallel with respect to the emission surface to the axial line of the tubular substrate. The thermionic electron emitter is prepared as follows. At the final stage of the wirecut discharging operation, the rotationof the tubular substrate is stopped and the tubular substrate undergoes only movement in the axial direction. For easy connection of them to metallic pieces 6A, 6B which are described below, the pair of end parts 3A, 3B are respectively finished to have a plane surface parallel with each other by the wirecut electric discharging operation and an opening 13 is formed in each of the end parts 3A, 3B by an electric discharging machine, the opening 13 being used for insertion of a screw.

The thermionic electron emitter is preferably secured to a terminal block 9 by connecting the both end parts 3A, 3B to the same through respective metallic pieces 6A, 6B for the purpose of feeding a current to the thermionic electron emitter and supporting it as shown in FIGS. 8 to 12. The metallic pieces may have any desired shape as long as they are useful for the above-mentioned purpose. It is essential to correctly fix the metallic pieces 6A, 6B to the terminal block 9. If there is an error in the distance or parallelism between the metallic pieces 6A, 6B, there may cause distortion in the spirally wound thermionic electron emitter elements, whereby they may be short-circuited or broken.

As the material of the metallic pieces, metal having a high melting point such as W, Ta, Mo is preferably used. However, Cu may be used if temperature applied to the thermionic cathode is low and the metallic pieces are effectively cooled. Foils 15A, 15B made of a material such as Ta, Mo may be respectively interposed between the metallic pieces 6A, 6B and the end parts 3A, 3B to obtain good condition of contact. In case that LaB$_6$ is used as the heat resistant and electric conductive inorganic compound and when the metallic pieces are heated at a relatively high temperature in use, an anti-reaction material such as a rhenium foil, a graphite sheet, a carbon sheet or so on may be interposed between the metallic pieces and the end parts so that the metallic pieces do not react with the inorganic compound and electric conductivity is not reduced at the contracting portions.

Figure 8:
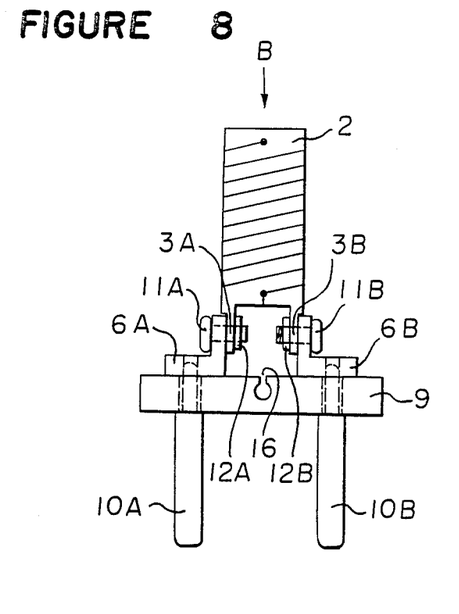
FIG. 8 is a front view showing an embodiment of the thermionic cathode structure according to the present invention.

The terminal block 9 should be made of a material durable to thermal shock and have a strong structure to such shock. For this purpose, ceramics such as alumina, boron nitride, silica, mica and so on is used and it preferably has a simple shape such as a circular plate, a rectangular plate and so on. For current conduction to the metallic pieces 6A, 6B, a pair of current feeding terminals 10A, 10B are attached to the terminal block 9 each one end of which is passed through the terminal block 9 and are respectively connected to the metallic pieces 6A, 6B as shown in FIG. 8.

The diameter of openings formed in the terminal block 9 is slightly greater than the diameter of the threaded portion of each of the current feeding terminals so that connection of the terminals to the metallic pieces can be adjusted. The of a jig makes the adjustment of positions of the metallic pieces and the current feeding terminals easy. After the adjustment of the positions, the thermionic electron emitter is fixed to the metallic pieces 6A, 6B by means of respective screws 11A, 11B and nuts 12A, 12B.

Figure 10:
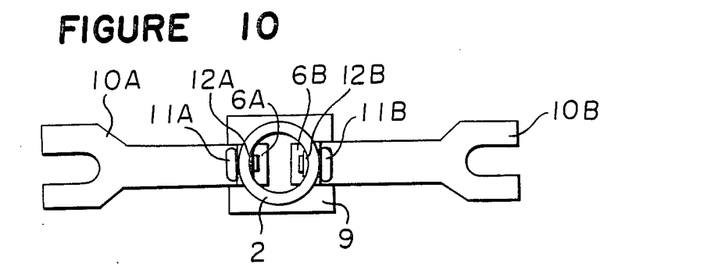
FIG. 10 is a front view showing another embodiment of the thermionic cathode structure according to the present invention.
Figure 11:
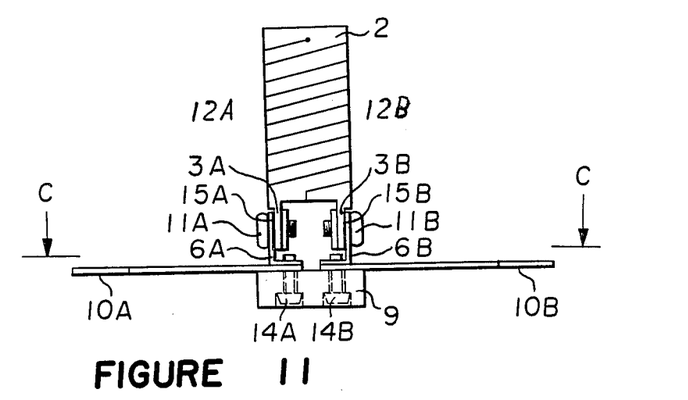
FIG. 11 is a front view of the thermionic cathode structure.
Figure 12:
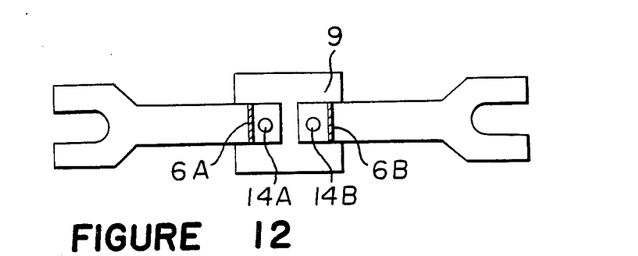
FIG. 12 is a cross-sectional view taken along a line C-C in FIG. 11.

It is not always necessary to perforate the terminal block 9 to have the current feeding terminals passed through the ternimal block 9, as the current feeding terminals and metallic pieces may be respectively overlaid on the terminal block and they are fixed to the same, as shown in FIGS. 10 to 12. Or, a single metal piece can be used instead of the metallic pieces 6A, 6B and current feeding terminals 10A, 10B.

Thus, by connecting the end parts 3A, 3B of the thermionic electron emitter to the terminal block 9, and excessive external force is not applied to the end parts of the emitter when the terminal block is handled. Therefore, there is no risk of breakage of the thermionic electron emitter.

According to the second embodiment of the thermionic cathode structure of the present invention, two thermionic electron emitter elements are arranged in parallel relationship with respect to their emission surface and are wound in a vortex form in a plane. Namely, a single thermionic electron emitter made of a heat resistant and electric conductive inorganic compound is bent at its center so that two thermionic electron emitter elements are extended in parallel with each other, and they are wound in a vortex form around the bent portion as the center in a plane. Both ends of the thermionic electron emitter elements are used as current feeding ports to be connected to a heating power source.

The second embodiment of the present invention will be described with reference to FIG. 25.

The material of the thermionic eletron emitter of the second embodiment is the same as that of the first embodiment.

The thermionic electron emitter has to be an elongted form so that uniform heating is obtainable by directly feeding an electric current. The length, the thickness and the shape in cross-section are desirably selected depending on the material to be used and a pattern of emission of thermionic electrons from the thermionic electron emitter. It is important in the second embodiment that the thermionic electron emitter is formed by bending a single elongated thermionic electron emitter element at its center so that two emitter elements are then extended in parallel with each other. With such a structure, the direction of the electric current passing in the two thermionic electron emitter elements are opposite to each other, whereby the direction of magnetic fields produced in the thermionic electron emitter elements are also opposite to each other, so that they are mutually cancelled. Accordingly, there is no adverse effect to the thermionic cathode structure.

it is also important in the second embodiment that the two parallel thermionic electron emitter elements are wound in a vortex form. Accordingly, needless radiation of heat from the thermionic electron emitter is reduced and radiation of thermionic electrons having a high spatial density is obtainable. Further, the structure of the thermionic cathode can be compact.

It is important that the ends parts 3A, 3B of the thermionic electron emitter elements are used as the current feeding ports to be connected to the heating power source to heat the thermionic electron emitter. Thus, by directly supporting a current to the single elongated thermionic electron emitter, a heating power supplied to the thermionic cathode can be small and the construction of the cathode can be simple.

In further studies of the construction of the thermionic electron emitter, the inventors of the present application have found another embodiment in which the magnetic fields are effectively cancelled. Namely, the thermionic cathode structure according to the modified embodiment is so constructed that a single elongated thermionic electron emitter element made of a heat resistant and electric conductuve inorgainc compound is arranged in a helical form in a plane in which opposing portions in a helical form are parallel with each other, and both free ends of the helical thermionic electron emitter element are used as current feeding ports to be connected to the heating power source. In other words, plural sections constituting a single thermionic electron emitter element are arranged in parallel with each other in a plane and the adjacent both ends of the sections are alternately connected so as to form a single thermionic electron emitter having a helical form. The above-mentioned embodiment will be described in detail with reference to FIG. 26.

The material of the thermionic electron emitter is the same as that of the first embodiment. The thermionic electron emitter has to be an elongated thin body so that uniform radiation of heat is obtained by directly supplying an electric current. The length, the thickness and the shape in cross-section of the thermionic electron emitter are desirably determined depending on the material to be used and a pattern of emission of the thermionic electrons.

The first important point in this embodiment is that the thermionic electron emitter is made of a heat resistant and electric conductive inorganic compound and assumes a single elongated body arranged in a snaking parallel form in a plane.

Figure 26:
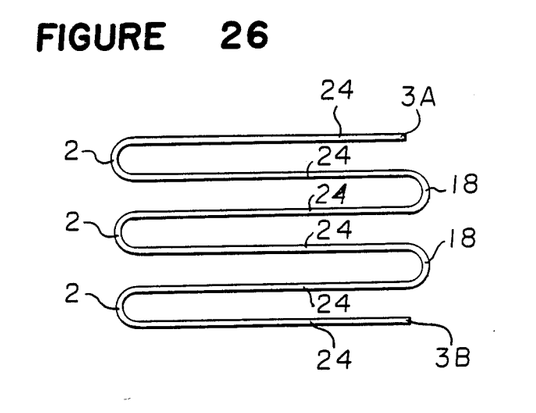
FIG. 26 is a plane view of still another embodiment of the thermionic electron emitter used for the thermionic cathode structure according to the present invention.

FIG. 26 shows a helical and parallel-arranged thermionic electron emitter which has a plurality of straight portions 24, a plurality of bent portions 2, a plurality of opposite bent portions 18 and two current feeding ports 3A, 3B. The adjacent straight portions are alternately connected by the bent portions 2 and 18, and the straight portions are in parallel with eachother and apart from at an equal distance. With such arrangement, the electric current flowing in the adjacent straight porions are opposite to each other; thus the magnetic fields produced in the adjacent straight portions are cancelled. Accordingly, undesired magnetic fields are not produced. It is preferably that the number of turning in the helical thermionic electron emitter is three or more from the viewpoint of improvement of the cancelling effect of the magnetic fields and the spatial density of the therminoic electrons emitted from the thermionic electron emitter.

The second important point is that the helical and parallel-arranged thermionic electron emitter is in a plane. With such arrangement, needless radiation of heat from the thermionic electron emitter is reduced; emission of the thermionic electrons is obtained at a high spatial density, and the thermionic cathode can be minimized.

The third important point is that the end parts 3A, 3B of the thermionic electron emitter are used as the current feeding ports to be connected to a power source which heats the emitter. Thus, by directly supplying an electric current to the elongated thermionic electron emitter, a heating power can be small and the construction of the thermionic cathode can be simple.

In the following, description will be made as to the terminal block used for the thermionic cathode structure.

The terminal block should have a structure difficult to deteriorate its insulating properties even though electrically conducting substance deposits on it by spattering effect. For this purpose, at least one groove is formed in a surface of the terminal block wherein the width of the groove at the opening on the terminal block surface is smaller than the width of the groove formed in the inner part of the terminal block.

As a material for the terminal block, alumina, boron nitrude, aluminum nitride, silica-type ceramics, mica-type ceramics or another similar material is preferably used.

Figure 13:
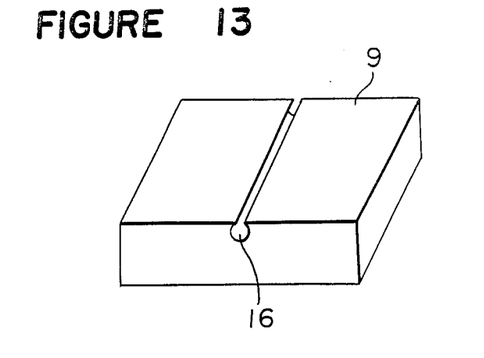
FIG. 13 is a perspective view of an embodiment of a terminal block used for the thermionic cathode structure of the present invention.
Figure 14:
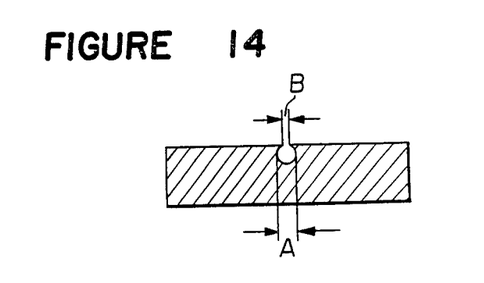
FIG. 14 is a cross-sectional view of the terminal block shown in FIG. 13.
Figure 15:
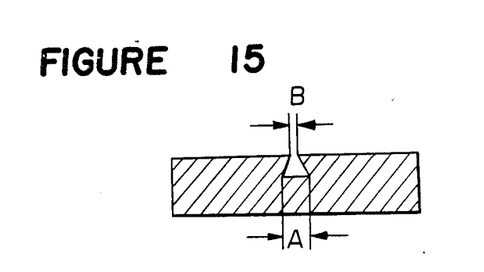
FIG. 15 is a cross-sectional view of another embodiment of the terminal block.

FIGS. 13–15 show an embodiment of the terminal block used for the thermionic cathode structure of the present invention. The width A of a groove 16 at the inner part of the ternimal block 9 is greater than the width B at the opening of the surface of the terminal block. The shape in cross-section of the groove is not limited to a circular form as in FIG. 14, but may be a triangle form as in FIG. 15. Also, it may be of an oval form or a substantially rectangular form as long as the width of the groove at the inner part is greater than the width at the opening.

Figure 16:
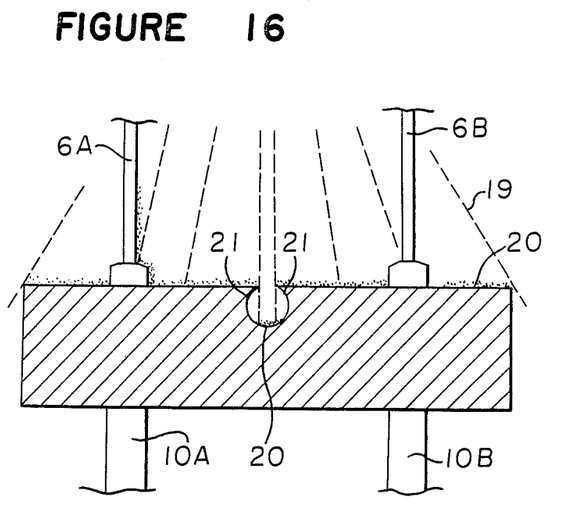
FIG. 16 is a diagram showing how the terminal block is used.

When the thermionic cathode structure with the teminal block is used, electrically conductive substance 19 scatters due to spattering, whereby an electrically conductive layer is produced on the surface of the terminal block by vapor deposition as shown in FIG. 16. However, since there is an orientation in the vapor deposition and at least one groove having a width at the inner part which is greater than the width at the opening is formed in a surface of the terminal block made of an insulating material, there remains a dead angle portion 21 in the groove where the vapor-deposited layer in not formed. Accordingly, insulation between the metallic piece 6A and the metallic piece 6B is maintained.

Figure 17:
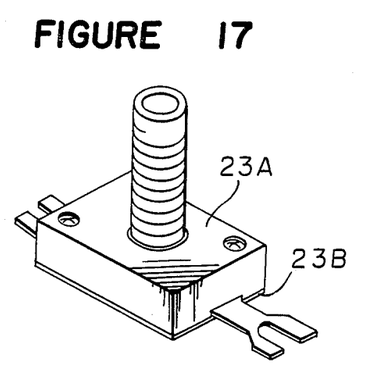
FIG. 17 is a perspective view of another embodiment of the thermionic cathode structure in which a cover member is mounted.

An additional feature which allows the thermionic cathode structure to be used for a long time without suffering adverse effect of spattering is to provide a cover member made of an insulating material around a terminal section for the thermionic electron emitter. The terminal section includes the terminal block 9 and the two end parts 3A, 3B of the thermionic electron emitter. It is desirable that the cover member completely covers the terminal block as an element of the thermionic cathode structure to avoid the vapor deposition of the conductive material on the surface of the terminal block, the vapor deposition being apt to cause a short-circuit across the end parts 3A, 3B (as shown in FIG. 17).

It is most desirable that the cover member completely covers metallic parts constituting the thermionic cathode so as not to cause deterioration of thermionic electron emission properties of the thermionic electron emitter by the vapor depostion of the metallic substance on it. The outer configuration of the cover member may be any type, for instance, a rectangular box shape, a cylindrical type, as far as it completely covers the terminal section. As a material for the terminal block, ceramics such as alumina, boron nitride, silicon nitride, silica-type ceramics, mica-type ceramics is preferably used from the viewpoint of heat resistant properties.

According to the present invention, the thermionic cathode structure produces no magnetic field when it is used. An ion source device with the thermionic cathode structure of the present invention provides a stable plasma without any disturbance of the magnetic field.

The thermionic cathode structure of the present invention can be easily installed in an apparatus such as a plasma generator, and there is not danger of breaking when it is used. A stress in the thermionic electron emitter due to thermal expansion is small and therefore, it is durable to a thermal shock.

In the thermionic cathode structure of the present invention, there is no undesired vapor deposition of the electrically conductive substance by spattering on the surface of the thermionic electron emitter when in use, and therefore, there is no deterioration of thermionic electron emission properties. There is further no vapor depostion of the electrically conductive substance on the surface of the terminal block, whereby a short-circuit does not take place across the terminals.

The thermionic cathode structure according to the present invention is suitable for a thermionic impact type ion source such as a Kaufman type, a Calutron type, a multi-electrode magnetic field type (bucket type), an electron oscillation type ion source such as a Nielsen type, a Scandinavian type, a spatter ion source such as a beam plasma type ion source, a Hill and Nelson type, various ion sources such as a PIG type ion source, mono-plasmatron, duoplasmatron, duopigatron, a tri-electrode spattering apparatus, an electron beam welding apparatus, an electron beam fusion apparatus, an electron beam exposure apparatus, an electron microscope, and a cathode ray tube.

Examples of the thermionic cathode structure of the present invention will be described in detail.

EXAMPLE 1

Figures 5, 6:
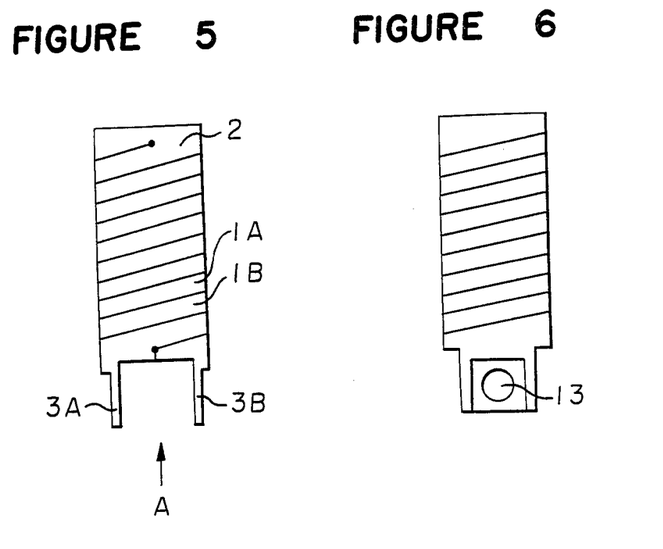
FIG. 5 is a side view of the thermionic electron emitter in the spiral form.
FIG. 6 is a front view of the thermionic electron emitter shown in FIG. 5.
Figure 7:
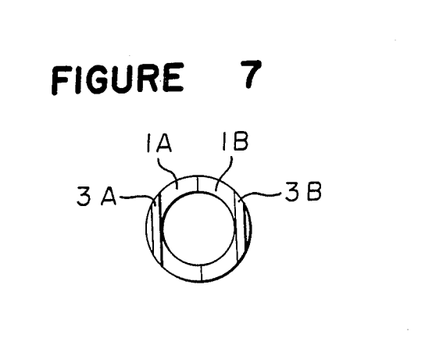
FIG. 7 is a bottom view of the thermionic electron emiter shown in FIG. 6.
Figure 9:
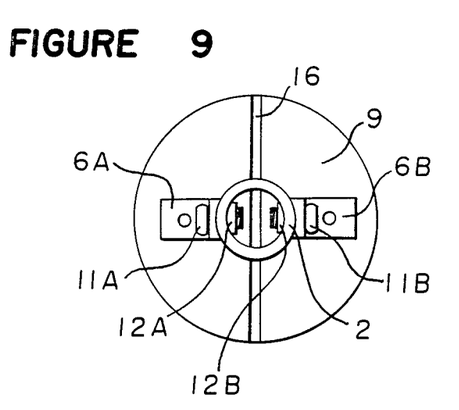
FIG. 9 is a plane view of the thermionic cathode structure in view of an arrow mark B in FIG. 8.

Lanthanum hexaboride is used as a material for a thermionic electron emitter and a cylindrical product having an outer diameter of 10 mm, an inner diameter of 7 mm and a height of 28 mm was prepared by a wirecut electric discharge method. A slit 4 was formed by the wirecut electric discharge method, whereby two end parts 3A, 3B are formed at one end portion of the cylindricl product as shown in FIG. 4. A through hole 5 was formed near the opposite end portion. A wire was inserted in the through hole 5. A wirecut discharging operation was conducted while the cylindrical product was rotated around the axial center and at the same time, the cylindrical product was moved along the axial direction to form two spiral thin elements having a cutting pitch of 4.1 mm and a cutting width of 0.3 mm as shown in FIGS. 5 to 7. Metallic pieces 6A, 6B made of tantalum were respectively attached to the end parts 3A, 3B of thus obtained thermionic electron emitter by means of screws 11A, 11B and nuts 12A, 12B as shown in FIGS. 8 and 9. Then, the metallic pieces 6A, 6B and current feeding terminals 10A, 10B were respectively connected to a terminal block 9 which was prepared by shaping a block made of boron nitride by a milling machine. A groove 16 of a circular form in cross-section having a diameter of 2 mm was formed in a surface of the terminal block. The current feeding terminals 10A, 10B were connected to a d.c. power source. The thermionic electron emitter is heated in a vacuumed condition of $1\times10^{-5}$ Torr by supplying a direct electric current. While the temperature of the thermionic electron emitter was measured by an optical pyrometer, the voltage of the power source was adjusted. As a result, a current of 98 amperes and a power of 490 watts were measured to maintain the temperature of the thermionic electron emitter at 2,000° C. The requisite power was about 70 percents in comparison with a power required when a filament having the same shape and a rectangular in cross-section of 1.5×1.75 mm was used. When a magnetic field in a space which was 5 cm apart from the spiral thermionic electron emitter was measured by a Gauss meter, a magnetic force of 0.1 gauss or lower was observed.

EXAMPLE 2

Sintering of powder of LaB$_6$ having average particle size of 8 μm was conducted by using a hot press method under a pressure of 150 kgf/cm$^2$ and a temperature of 2,000° C. to obtain a sintered product having a porosity of about 15%. The sintered product was shaped by a wirecut electric discharge method to form a tubular body having an outer diameter of 10 mm, an inner diameter of 7 mm and a height of 27.5 mm. Then, by using the same electric discharge method, two parallel-arranged spiral elements were obtained. The pitch of thus obtained spiral elements was 3.6 mm and the cutting width was 0.3 mm. The end parts 3A, 3B of the thermionic electron emitter were respectively shaped to be flat by the wirecut electric discharge method as shown in FIGS. 5 to 7. Then, the end parts 3A, 3B, metallic pieces 6A, 6B made of tantalum current feeding terminals 10A, 10B made of tantalum were respectively connected to the terminal block 9 made of boron nitride by using respective screws 14A, 14B made of stainless steel. Then, the end parts 3A, 3B were respectively connected to the metallic pieces 6A, 6B with thin sheets 15A, 15B of tantalum by means of screws 11A, 11B made of molubdenum and nuts 12A, 12B made of tantalum.

Figure 18:
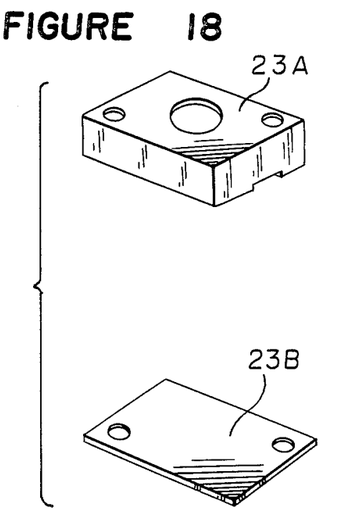
FIG. 18 is a perspective view of a cover member shown in FIG. 17.

A cover was prepared by cutting a sintered body of boron nitride (FIG. 18) and the cover was attached to the terminal section of the thermionic electron emitter as shown in FIG. 17.

Thus obtained thermionic cathode structure was heated in a vacuum condition of $1\times10^{-5}$ Torr by supplying a direct current 37 amperes. The thermionic cathode of LaB$_6$ could be heated at a normal operation temperature of 1,500° C. The voltage applied to the thermionic cathode was 6.1 volts. Then, 6.1 volts of voltage was fixed and on-off operations of the heating current were repeatedly conducted to the thermionic cathode. In the tests of turning on and off operations of five times, the thermionic cahtode of LaB$_6$ did not break and there was no change in resistance after the tests. Measurement of the magnetic field in a space which was 5 cm apart from the thermionic electron emitter by using a Gauss metter revealed 0.1 gauss or lower.

The thermionic cathode structure was installed in a cusp type ion source apparatus and electric discharging tests were conducted by application of an arc current of 7 amperes and an arc voltage of 60 volts for 81 hours in continuous manner under a vacuum condition of argon at $5 \times 10^{-5}$ Torr. The tests revealed that there was not short-circuit between the terminals of the thermionic cathode, and the heating current of the cathode was stable in the range of 39 amperes-42 amperes.

EXAMPLE 3

Figure 19:
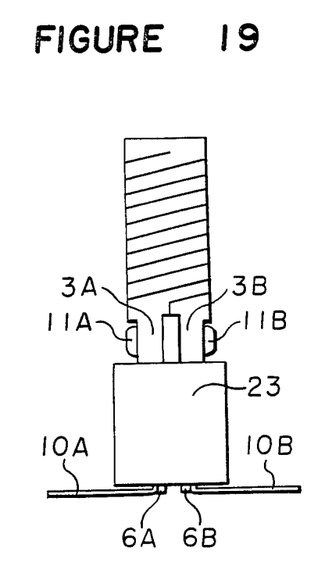
FIG. 19 is a front view of another embodiment of the thermionic cathode structure according to the present invention.
Figure 20:
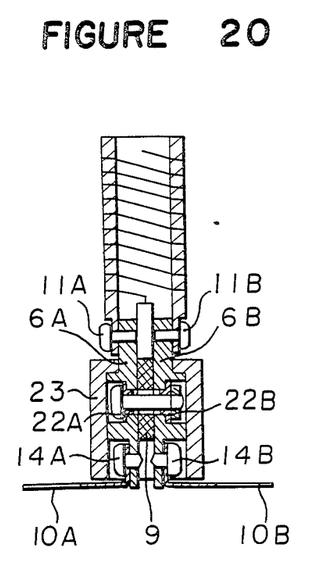
FIG. 20 is a longitudinal cross-sectional view of the thermionic cathode structure shown in FIG. 19.
Figure 21:
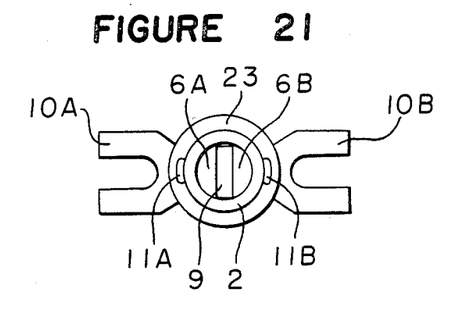
FIG. 21 is a plane view of the thermionic cathode structure.

A termionic electron emitter was prepared in the same manner as Example 2. Then, as shown in FIGS. 19 to 21, metallic pieces 6A, 6B made of molybdenum were respectively attached to current feeding terminals 10A, 10B by means of screws 14A, 14B made of stainless steel. A terminal block 9 made of boron nitride was inserted between the metallic pieces 6A, 6B while insulators 22A, 22B made of alumina were respectively interposed between the terminal block 9 and the both metallic pieces 6A, 6B followed by connecting them by means of a screw and a nut both made of stainless steel.

A cover 23 made of boron nitride was fitted from the top of the metallic pieces 6A, 6B and then, a thermionic electron emitter was inserted at the upper part of the metallic pieces 6A, 6B and thereafter, the end parts 3A, 3B of the thermionic electron emitter were respectively connected to the metallic pieces 6A, 6B by screws 11A, 11B made of molybdenum.

Thus obtained thermioinic cathode structure was installed in a cusp type ion source apparatus, and electric discharge tests were conducted by application of an arc current of 7 amperes and arc voltage of 60 volts for continuous 100 hours under the vacuumed condition of argon at $5 \times 10^{-5}$ Torr. It was found that there is no short-circuit between the terminals of the thermionic cathode and the heating current of the cathode was stable in the range of 39 amperes-41 amperes.

EXAMPLE 4

Figure 22:
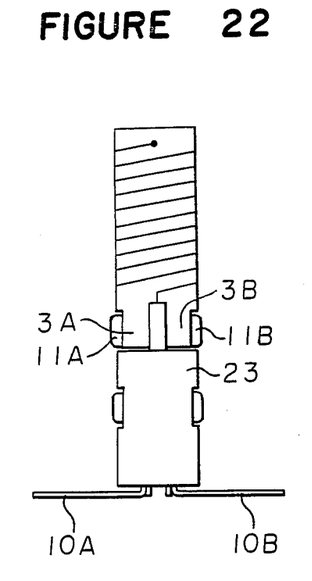
FIG. 22 is a front view of still another embodiment of the thermionic cathode structure according to the present invention.
Figure 23:
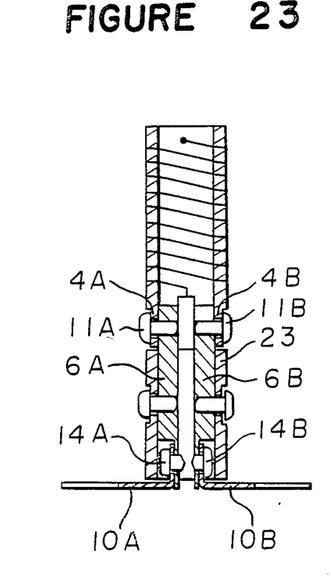
FIG. 23 is a longitudinal cross-sectional view of the thermionic cathode structure shown in FIG. 22.
Figure 24:
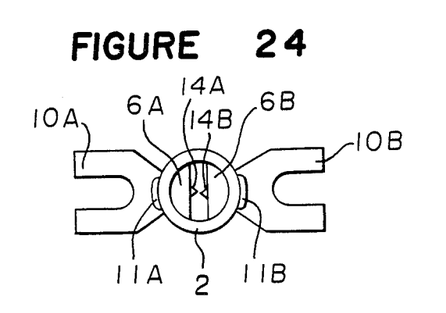
FIG. 24 is a plane view of the thermionic cathode structure.

A therminoic electron emitter was prepared in the same manner as Example 2. As shown in FIGS. 22 to 24, metallic pieces 6A, 6B made of molybdenum were respectively attached to current feeding terminals 10A, 10B made of tantalum by screws 14A, 14B made of stainless steel; then, a cylindrical cover 23 made of boron nitride was fixed to the metallic pieces 6A, 6B by screws made of stainless steel, and thereafter, the end parts 3A, 3B of a thermionic electron emitter were respectively fixed to the metallic pieces 6A, 6B by screws 11A, 11B made of molybdenum.

Thus obtained thermionic cathode structure was installed in a cusp type ion source appartus and electric discharge tests were conducted continuously for 100 hours under the same conditions as in Example 2. It was found that there is no short-circuit between the terminals, and a heating current for the thermionic cathode was stable in the range of 39 amperes-42 amperes.

EXAMPLE 5

Figure 25:
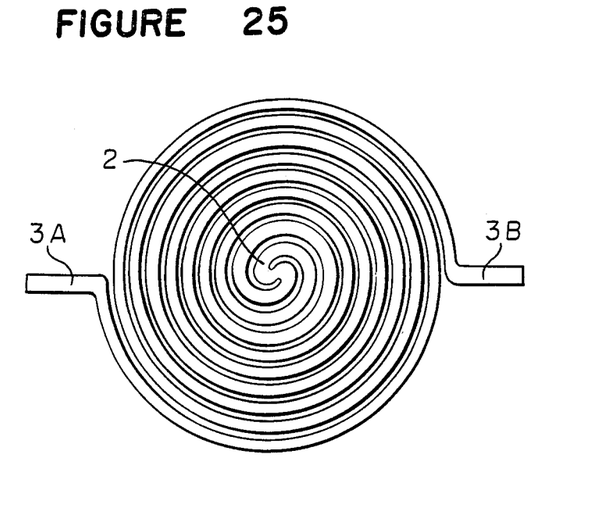
FIG. 25 is a plane view of another embodiment of the thermionic electron emitter used for the thermionic cathode structure according to the present invention.

FIG. 25 shows a thermionic cathode according to this embodiment. $LaB_6$ was used for a thermionic electron emitter. The thermionic electron emitter was prepared as follows. First, $LaB_6$ was subjected to wirecut electric discharging to be formed into a circular disc having an outer diameter of 50 mm and a thickness of 1.5 mm. Then, portions corresponding to the end parts 3A, 3B of the thermionic electron emitter were shaped in a linear form and the inner part of the circular disc was round-processed. Then, cutting operations were initiated from one end part 3A. After the cutting operation reached the turning point 2, the cutting opertion was forwarded to the other end part 3B. Upon reaching the end part 3B, the cutting operation was reversely conducted toward the first end part 3A along the cutting line already formed to thereby form a vortex-shaped thermionic electron emitter. The outer diameter of the emitter was 30 mm; the width of the vortex element was 1 mm and the gap between the adjacent parts of the element was 0.5 mm.

The end parts 3A, 3B of thus obtained thermionic cathode were respectively attached to supporting electrodes in a vacuum chamber. A direct current power source was connected to the supporting electrodes and the thermionic cathode was heated under a pressure of $1 \times 10^{-5}$ Torr. It was found that a current of 36 amperes and a heating power of 576 watts were required to maintain the temperature of the thermionic electron emitter at 1,650° C. In this case, an emission current was 205.6 amperes.

In measurement by a Gauss meter of a magnetic field in a space 5 cm apart from the thermionic electron emitter, there was found 0.2 gauss or lower. On-off tests at a temperature of 1,650° C. were conducted ten times, and there was found no crack in the thermionic electron emitter.

EXAMPLE 6

Figure 27:
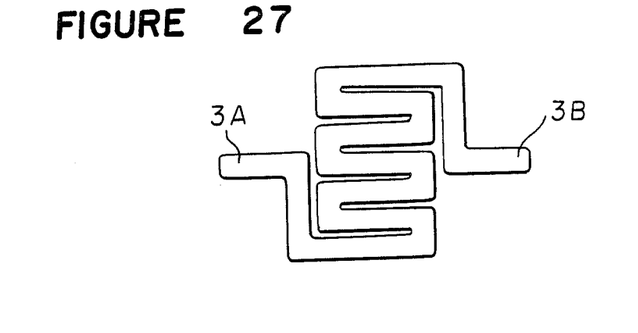
FIG. 27 is a plane view showing a separate embodiment of the thermionic electron emitter.
Figure 28:
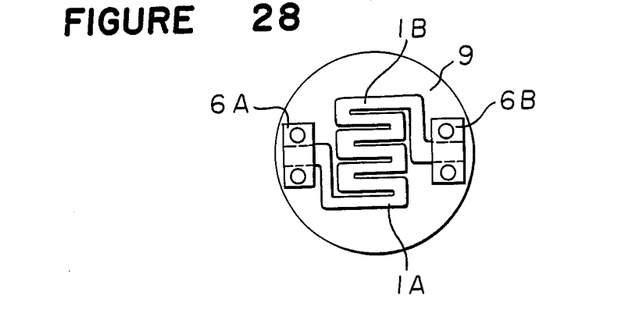
FIG. 28 is a plane view showing the thermionic cathode structure in which the thermionic electron emitter shown in FIG. 27 is mounted.
Figure 29:
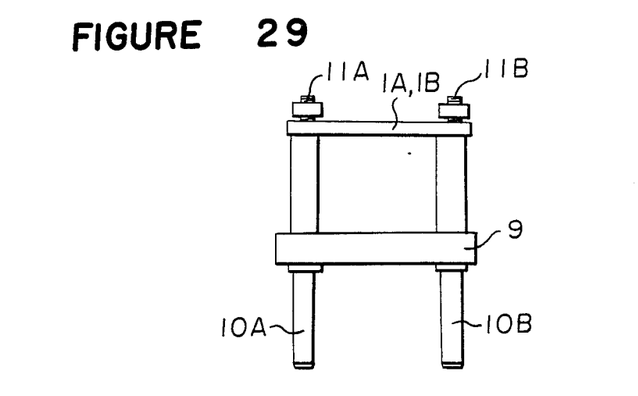
FIG. 29 is an eleveation view of the therminoic cathode structure in which the thermionic electron emitter shown in FIG. 27 is mounted.

A sintered product of lanthanum hexaboride was used for a thermionic electron emitter. A $LaB_6$ sintered product in a plate form having a thickness of 1.5 mm was prepared, and it is cut by wirecut electric discharging to obtained a snake-formed product having a width of 2 mm and the width of a gap of 0.5 mm as shown in FIG. 27. The snake-shaped product was assembled as shown in FIGS. 28 and 29.

Current feeding terminals of thus obtained assembly were respectively attached to supporting electrodes in a vacuum chamber. A d.c. power source was connected to the supporting electrodes and the thermionic electron electrode was heated in a vacuum condition of $1 \times 10^{-5}$ Torr. A power and a current which were necessary to maintain the temperature of thermionic electron emitter at 1,650° C. were respectively 242 watts and 71 amperes. An emission current was 84 amperes. In measurement by a Gauss meter of a magnetic field in a space 5 cm apart from the thermionic electron emitter, there was found 0.18 gauss or lower. When on-off tests as 1,650° C. were repeatedly conducted ten times, there was found no crack in the termionic electron emitter.

We claim:

1. A method of making a thermionic cathode structure comprising the steps of:
    cutting by a wire cut method a heat resistant and electrically conducting inorganic tubular substrate such that two parallel thermionic electron emitting elements are formed in a reverse-helical manner which are arranged so that their emissive surfaces are parallel to each other and wherein one end of each said elements is connected to the one end of the other elements and providing current feeding ports on the remaining end of each of said elements.

2. A method of making a thermionic cathode structure selected from the group of a vortex form, a snaky form or a zig-zag form comprising the steps of:

cutting a heat resistant and electrically conductive inorganic plate or disc by wirecut electric discharging; and attaching end parts of thus obtained thermionic cathode to supporting electrodes; and covering the current feeding ports with an insulating cover member at the terminal sections of said thermionic electron emitter elements.

3. A method of making a thermionic cathode structure according to claim 1, wherein said each one end of the element which serves as a current feeding port is fixed to an insulating substrate through metallic pieces.

4. A method of making a thermionic cathode structure according to claim 1, wherein said thermionic electron emitter elements are respectively formed by a single crystal or a sintered product of lanthanum hexaboride.

5. A method of making a thermionic cathode structure according to claim 1, wherein said current feeding ports of the thermionic electron emitter elements are connected to a terminal block of an insulating material which has at least one groove whose width at the surface of said terminal block is smaller than the width of the terminal block at the inner part of said groove.

* * * * *

UNITED STATES PATENT AND TRADEMARK OFFICE
CERTIFICATE OF CORRECTION

PATENT NO. : 4,878,866
DATED : NOVEMBER 7, 1989
INVENTOR(S) : Yoshiharu MORI ET AL It is certified that error appears in the above-identified patent and that said Letters Patent is hereby corrected as shown below:

Column 1, line 21, change "compoud" to --compound--.

Column 4, line 16, change "eleveation" to --elevation--.

Column 6, line 13, between "the" and "of" insert --use--;

line 51, change "elongted" to --elongated--.

Column 8, line 27, change "nitrude" to --nitride--.

Column 10, line 23, change "force" to --flux--;

line 49, change "molubdenum" to --molybdenum--.

Signed and Sealed this

Eleventh Day of February, 1992

Attest:

HARRY F. MANBECK, JR.

*Attesting Officer*  *Commissioner of Patents and Trademarks*